United States Patent [19]

Frank

[11] 4,006,711
[45] Feb. 8, 1977

[54] UNITARY LINER FOR AN AQUARIUM

[76] Inventor: Michael G. Frank, 204 Weeping Willow Lane, Fairfield, Conn. 06430

[22] Filed: July 28, 1975

[21] Appl. No.: 599,680

[52] U.S. Cl. .................................................. 119/5
[51] Int. Cl.² ...................................... A01K 64/00
[58] Field of Search ...................................... 119/5

[56] References Cited

UNITED STATES PATENTS

| | | | |
|---|---|---|---|
| 3,390,665 | 7/1968 | Wininger | 119/5 |
| 3,490,416 | 1/1970 | Kelley et al. | 119/5 |
| 3,744,454 | 7/1973 | Willinger et al. | 119/5 |

*Primary Examiner*—Hugh R. Chamblee
*Attorney, Agent, or Firm*—Mattern, Ware, Davis & Stoltz

[57] ABSTRACT

A decorative unitary aquarium liner for simulating a scene underwater comprises a bottom and a diorama backdrop that are integrally combined to form a unitary aesthetic scene. The bottom and diorama backdrop may be formed from the same sheet of material, such as thermoform plastic and the diorama backdrop may provide enclosures for accommodating aquarium water circulating conduits connected to pump and filter assemblies, aquarium aeration conduits and illumination accessories, if desired. The aeration outlet to the aquarium may pass through an orifice in the bottom portion of the aquarium liner. The aquarium liner may optionally incorporate side portions integrally combined with the bottom and diorama backdrop to form a multisided liner. The outer surface of the liner may have irregular contours to simulate a natural underwater environment. The unitary aquarium liner eliminates the need for sand and gravel presently used in most convention aquariums. The diorama backdrop may alternately provide a recess for a box-type water filter and be used without the bottom liner if only a decorative backdrop is desired.

19 Claims, 11 Drawing Figures

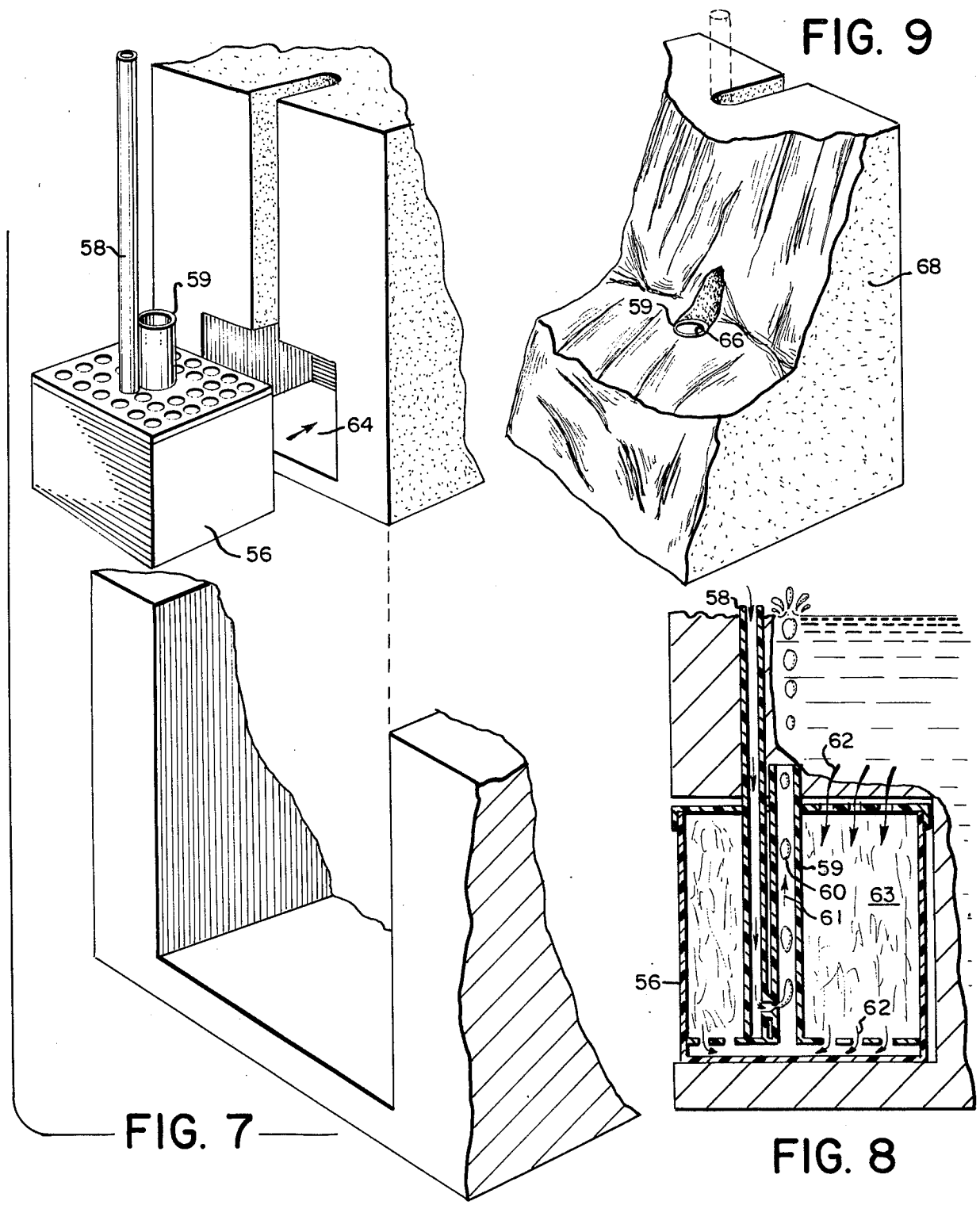

UNITARY LINER FOR AN AQUARIUM

BACKGROUND OF THE INVENTION

1. Field of the Invention

The present invention relates to aquarium liners and in particular to decorative liners for insertion in an aquarium to eliminate the use of sand and gravel as well as other materials and to provide a decorative underwater scene that conceals aquarium accessories such as circulating conduits, aeration conduits, and illumination or other accessories.

2. Description of the Prior Art

Prior art patents have disclosed aquarium accessories for enhancing the appearance of the aquarium. Many of these prior art patents deal with the bottom portion of the aquarium. Thus, U.S. Pat. No. 3,744,454, Willinger et al, discloses a rock and gravel bed simulation for aquariums that incorporates a blank with an upper surface having a roughened texture that fits over the bottom wall of an aquarium and which therefore may be used instead of rock, sand, or gravel beds. Other prior art patents such as U.S. Pat. No. 3,563,204, Szilagyi, disclose an illuminated aquarium where the bottom wall of the aquarium is illuminated by a pair of lights and a translucent or light impervious bottom is placed over the base of the aquarium so as to yield a pleasing appearance to the aquarium. These patents do not disclose or suggest unitary decorative liners for aquariums that eliminate the need for sand, gravel and rocks as well as concealing aquarium accessories such as circulation and aeration conduits, heaters, and illumination accessories.

Other prior art patents such as U.S. Pat. Nos. 475,404, Lochmann; 1,777,944, Trovato; 1,991,683, Kelly; 1,974,068, Greensaft: 3,119,371, Zuckerman; 3,121,417, Goldman et al; and 3,763,997, Willinger et al disclose backdrops of various types for aquariums so as to give the aquarium a more aesthetic, natural appearance. However, none of these prior art patents disclose a backdrop which is mounted within the aquarium and which conceals the aquarium water circulating conduits connected to pump and filter assemblies. Furthermore, an aquarium backdrop commercially sold by Marineland Products, of Los Angeles, California, may conceivably conceal circulating conduits, but it is to be solely used with a gravel base. The present invention not only conceals the conduits and the heater, but allows their unhampered operation while eliminating the use of a gravel base. An alternate version of the backdrop of the present invention provides a recess for a box-type water filter. This backdrop may be used without the bottom liner if only a decorative backdrop is desired.

The present invention teaches a unitary aquarium liner incorporating a bottom wall and a diorama backdrop which are integrally connected to form a unitary structure that has a pleasing aesthetic appearance as well as concealing aquarium water circulating conduits which are commonly used in aquariums as well as other aquarium accessories. This liner not only eliminates the need for sand and gravel beds normally used in aquariums, but also conceals conduits extending within the aquarium which are used for a connection to pumps and filter assemblies as well as to conceal any lighting accessories employed in any area of the aquarium.

SUMMARY OF THE INVENTION

A unitary aquarium liner of the present invention comprises a bottom and an integrally connected diorama backdrop which are adapted for placement within an aquarium. The invention eliminates the need for sand and gravel commonly used in aquariums, which tend to collect fish, animal and dust debris and therefore require periodic removal, and is therefore a solution to an ever-present problem in most aquariums. Furthermore, the bottom and backdrop diorama liner of the present invention may have irregular contours as well as artificial plant holding receptacles in order to generate an aesthetically pleasing underwater scene. The liner therefore eliminates the need for arranging sand and gravel in the aquarium so as to give an underwater appearance. Furthermore, the diorama backdrop is able to conceal conduits running into the aquarium from external filters and pumps as well as aquarium heaters, and thereby conceals these otherwise distracting articles in the aquarium without hampering their operations. The overall effect of the present invention in an aquarium is that it yields an extremely pleasing appearance to the aquarium while eliminating the most important problem of aquariums; that is, the periodic cleaning of the sand and gravel. In addition, it eliminates the need for periodic replacement of the sand and gravel from an aquarium when the sand and gravel become too dirty to clean.

The liners of the present invention may be formed from a thermoplastic material. If the material from which the present invention is made has a density less than water, weights of a greater density than water may be secured to the liner, away from the observer's view, in order to increase the overall density of the liner so as to remain in the aquarium tank without floating. Alternately, the aquarium liner of the present invention may be secured to the aquarium by use of an adhesive material regardless of the density of the material from which the liner is made. Other well known adhering techniques may also be used.

In a salt water aquarium version of the present invention, the backdrop diorama integrally connects with an undergravel filter which is required in such aquariums and therefore combines to conceal the filter conduits used in such aquariums. The backdrop diorama additionally may conceal any heater apparatus normally used to maintain the aquarium water at a desired temperature. In the salt water version, due to the nature of salt water aquarium, a pH buffering gravel is necessary. Thus, the present invention may alternately include a decorative porous bottom cover over the pH buffering gravel material so as to yield an overall aesthetically pleasing appearance to the salt water aquarium while not inhibiting the functioning of the buffering material.

Furthermore, the bottom portion of the liner may include one or more orifices through which aeration extensions may pass in order to provide a simple, yet pleasing manner in which to provide oxygen to the aquarium. The air conduit tubes commonly seen in present-day aquariums are not seen because of the combination of the diorama backdrop and the bottom wall behind which the tube may pass.

OBJECTS OF THE INVENTION

Therefore, it is a principal object of the present invention to provide a unitary aquarium liner for covering the bottom and back walls of an aquarium so as to yield an aesthetically pleasing appearance to the aquarium without the addition of other materials.

Another object of the present invention is to provide a unitary aquarium liner as described above that eliminates the need for the addition of sand and gravel to the aquarium and therefore eliminates periodic cleaning and removal of the sand and gravel.

A further object of the present invention is to provide a unitary aquarium liner as described above that incorporates a diorama backdrop that conceals conduits placed within the aquarium for connection to aquarium pumps, filters, and other accessories as well as to conceal aquarium heaters while not hindering the operation of the heaters or the aquarium pumps, or filters.

Another object of the present invention is to provide a unitary aquarium liner that is extremely easy to install.

A further object of the present invention is to provide a unitary liner of the above description that provides a conduit within the bottom portion of the liner for insertion of an aeration extension outlet for providing oxygen to the water in the aquarium while concealing the tubing used to connect this extension to the external aeration generating device.

An additional object of the present invention is to provide an aquarium liner of the above description that combines with an ordinary aquarium to form an aquarium that is ready to use as is without the addition of sand or gravel, as opposed to present-day aquariums that require a great deal of time to properly install.

A further object of the present invention is to provide a unitary liner of the above description that is adapted for use with salt water aquariums so as to conceal conduits and heaters entering the salt water aquarium.

An additional object of the present invention is to provide a diorama backdrop that incorporates a recess dimensioned to enclose a box type water filter, which backdrop may be used solely or in conjunction with a bottom liner.

Other objects of the present invention will in part be obvious and will in part appear hereinafter.

THE DRAWINGS

FIG. 7 is a partially cut away perspective view of a portion of a diorama backdrop of the present invention adapted for concealment of a box filtration accessory;

FIG. 8 is a partially cut away cross-sectional side elevational view of the portion of the diorama backdrop of the present invention as shown in FIG. 7 showing the operation of the box filter and the circulation of water from the aquarium through this portion of the unitary liner;

FIG. 9 is a partially cut away perspective view of the portion of the diorama backdrop shown in FIG. 7 showing a portion of the box filter circulating conduit extending through an orifice in this portion of the unitary liner;

DETAILED DESCRIPTION

Figure 1:
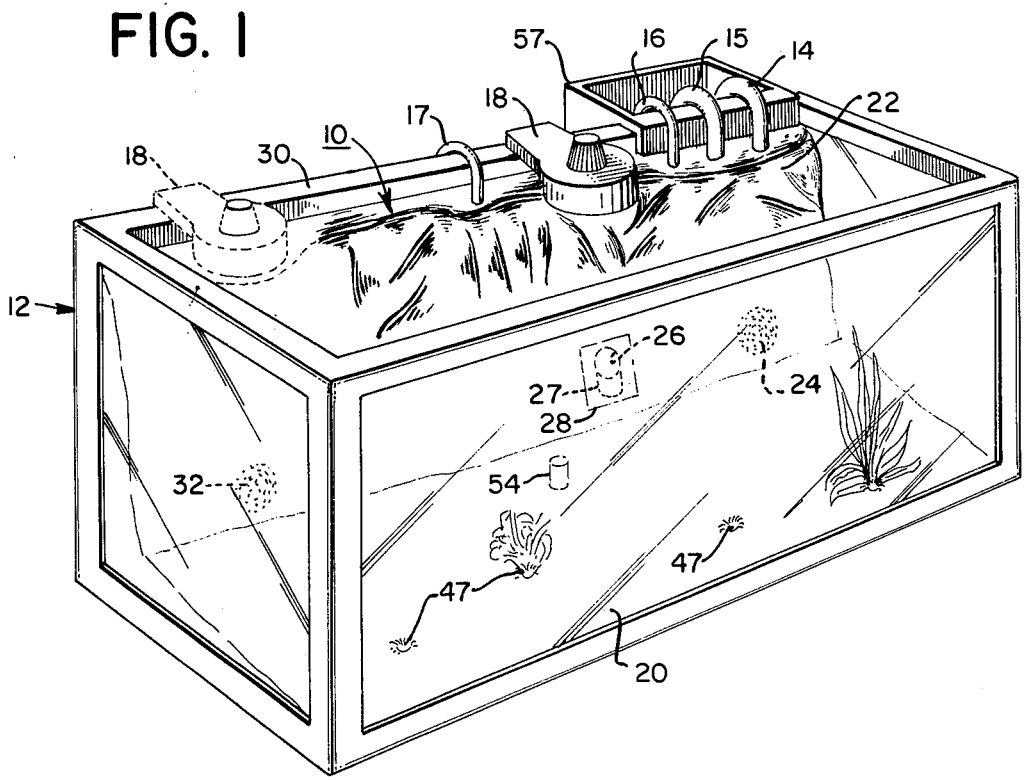
FIG. 1 is a perspective view of the present invention showing the unitary liner installed in an aquarium so as to conceal the aquarium pumps and other accessories.
Figure 2:
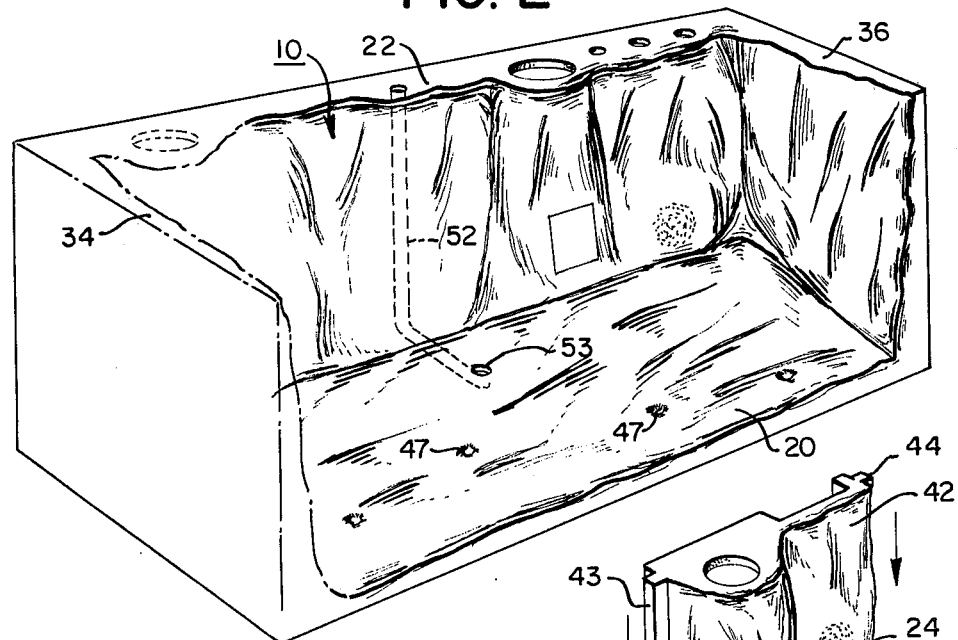
FIG. 2 is a perspective view, partially in phantom, showing the unitary liner of the present invention with alternate side portions.

As best seen in FIGS. 1 and 2, a decorative unitary aquarium liner 10 is dimensioned to fit into a standard aquarium tank 12 so as to yield a pleasing appearance to the aquarium when filled with water as well as to conceal aquarium accessories such as circulating conduits 14, 15, and 16, aeration conduit 17 and water heater 18 without interfering with the effectiveness of these accessories. The liner preferably comprises a bottom 20, and a diorama backdrop 22 which are integrally connected so as to form a unitary liner. The diorama backdrop incorporates a perforated or porous region 24 that allows for the passage of circulating water to the circulating conduits 14, 15, and 16. In addition, the diorama backdrop may preferably include an orifice 26 to allow a heater tube 27 of the aquarium heater to pass therethrough into the main body portion of the aquarium tank. A backdrop extension 28 extends in front of orifice 26 so as to conceal the orifice as well as the lower portion of the heater tube 27. Since this extension extends in front of the remainder of the backdrop, water may easily circulate around the heater tube 27 thereby promoting heat convection from the heater to the aquarium water.

Alternatively, the heater 18 may be placed on the opposite end of the rearward wall 30 of the aquarium, and the diorama backdrop may alternatively incorporate a second perforated region 32 on which to allow water to circulate around the heater tube of the heater instead of having a lower portion of the heater tube pass through a second aperture in the diorama backdrop.

Figure 3:
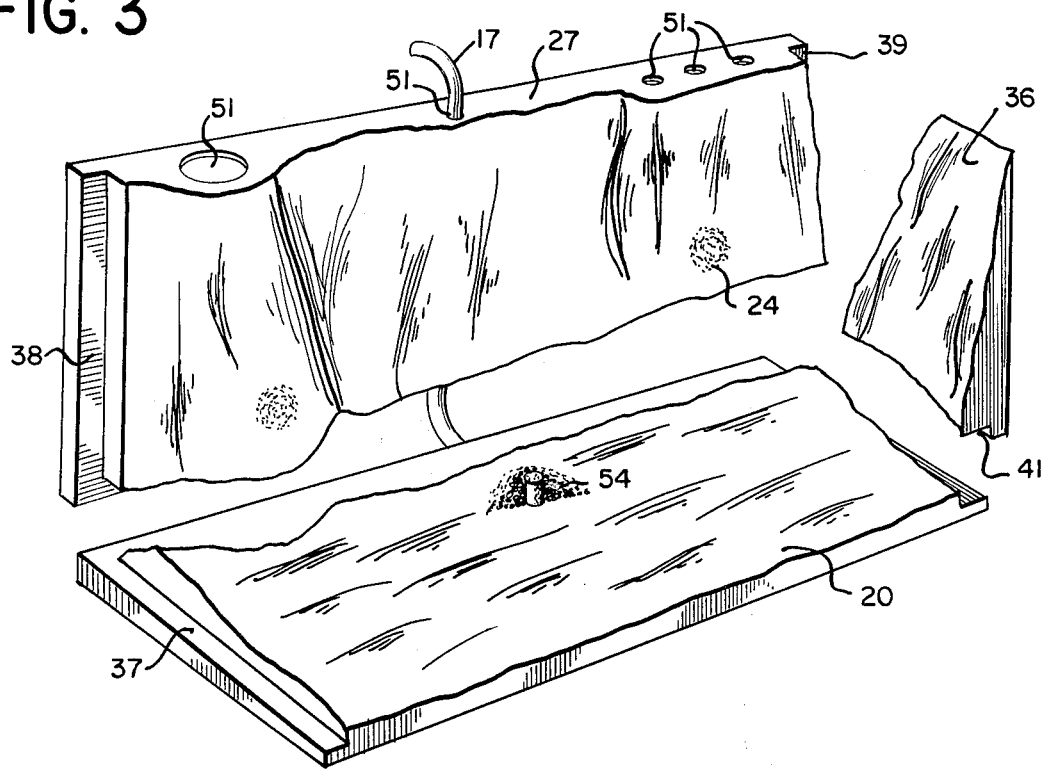
FIG. 3 is a perspective view of a unitary liner similar to that shown in FIG. 1, showing the method in which the various portions of the liner interfit to form a unitary liner as well as an alternate side portion.

As best seen in FIG. 2, the decorative unitary aquarium liner 10 of the present invention may further comprise integral sidewalls 34 and 36 in addition to the bottom 20 in diorama backdrop 22. With or without these sidewalls, the present invention is easily installed in a standard aquarium by simply inserting the structure within the aquarium. As best shown in FIG. 3, the present invention may incorporate separate portions comprising the bottom 20, the diorium backdrop 22 as well as the sides 34 and 36. In such an embodiment, these portions of the liner are dimensioned for interfitting and thereby allowing the liner to be also easily placed within an existing aquarium. In this alternate method of fabricating the present invention, the portions forming the bottom, the diorium backdrop and the sides may be glued to one another or may interfit with one another along groove-forming members 37, 38, 39, 40 and 41.

The decorative unitary aquarium liner 10 is preferably formed from a thermoplastic material. Alternatively, the aquarium liner may be formed from a material that is water porous. The water flow through the porous material and under the liner eliminates the deposition of dust and fish debris under the liner while maintaining adequate filtration of the water to remove such materials. Thus, the present invention is able to solve a problem found in most aquariums using sand and gravel to form the bottom portion of the aquarium. These materials, when deposited in the aquarium, collect and trap dirt and fish debris in such a tenacious manner that the filtration system of the aquarium is simply unable to clean this gravel, sand or rocks. This dirt generates nitrogen gas and harbors bacteria which both may be detrimental to fish within the aquarium. Thus, the typical aquarium owner must periodically remove or clean this sand and gravel from his aquarium. He must then clean his aquarium and reinsert new, clean, sand and gravel. This periodic cleaning of the aquarium is highly undesirable, and the present invention, by eliminating the need for sand and gravel, eliminates this task while concealing aquarium accessories which are typically very unsightly to the fish admirer...

As seen in FIGS. 1 and 2, the bottom 20 of the aquarium liner 10 may include receptacles 47 for grasping underwater artificial or natural plants or other decorations. These receptacles may be molded into the bottom or placed thereon by adhesives or other well-known techniques.

Figure 4:
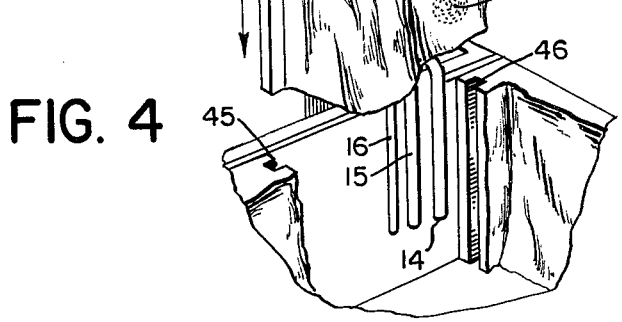
FIG. 4 is a partially cut away perspective view of the unitary liner of FIG. 1 showing an alternate embodiment of the liner that allows removal of a portion thereof so as to allow ready access to circulating conduits.

As best shown in FIG. 4, a portion 42 of the diorama backdrop normally enclosing the circulating conduits 14, 15 and 16 as well as the heater 18 may slideably interfit with the remainder of the diorama backdrop along vertical tabs 43 and 44 interfitting with vertical grooves 45 and 46 of the remainder of the backdrop diorama. In this embodiment of the present invention, the circulating conduits as well as the heater may be very easily installed in the aquarium, while allowing them to be further easily removed from the aquarium.

Figure 5:
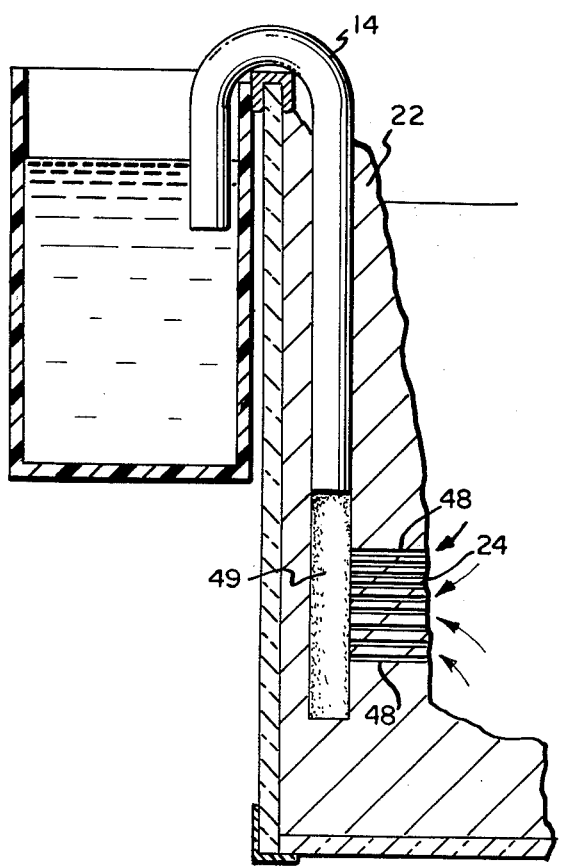
FIG. 5 is a partially cut away cross-sectional side elevational view of the unitary liner of FIG. 1 showing the liner fabricated from a solid material and showing the connection of circulating conduits with the water of the aquarium.

As best shown in FIG. 5, if the aquarium liner is formed from a solid material, such as a thermoformed plastic, the perforated region 24 of the diorama backdrop 22 incorporates a plurality of water circulating passageways 48 that communicate with cylindrical chambers 49 which are dimensioned for housing the lower portion of the circulating conduit tubes 14, 15 and 16. Thus, water enters through the water passageways 48, through water intake circulating conduits 14 and 15, and the filtered water is returned to the aquarium via circulating conduits 16 (see FIG. 1).

Figure 6:
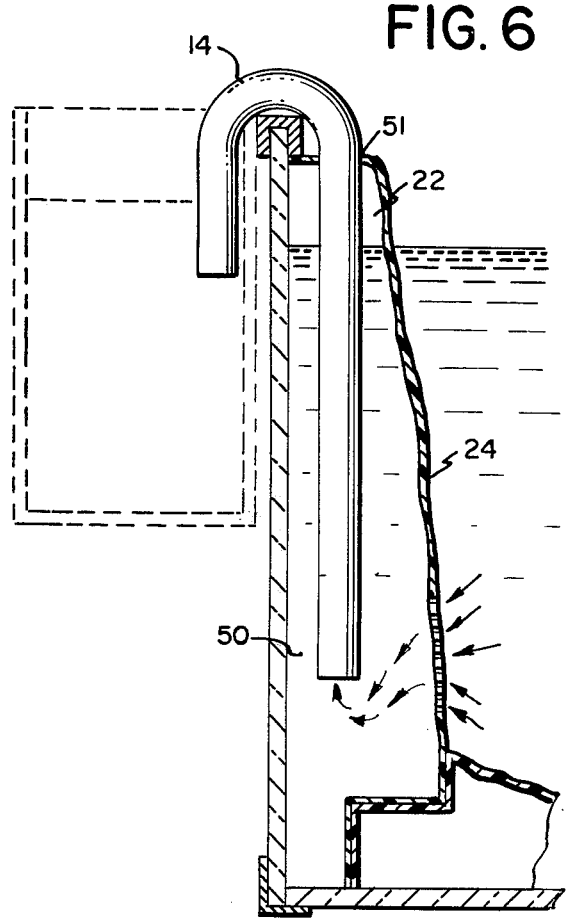
FIG. 6 is a partially cut away cross-sectional side elevational view similar to FIG. 5 showing an alternate method of fabrication of the unitary liner from a thin walled material and the interrelationship of the circulating conduits with the water of the aquarium.

If the diorama backdrop is formed from a thin-walled material such as that shown in FIGS. 3 and 6, the water simply passes through the perforated region 24 of the diorama backdrop into a rearward water cavity 50 in which the water circulating conduits are housed. The circulation of the water into and out of the water circulating conduits is the same as that described for FIGS. 1 and 5. The aquarium accessories pass through apertures 51 in the upper portion of the diorama backdrop communicating with water cavity 50.

As best seen in FIGS. 1 and 2, the diorama backdrop 22 and bottom 20 of the present invention may incorporate one or more aeration conduit passageways 52 for insertion of one or more aeration conduits 17. The aeration conduit passageway has an aperture 53 for protrusion of the aeration conduit through the bottom of the aquarium liner. Thus, air may be pumped into the aquarium via this aeration conduit while concealing the actual conduit from the observer's view. An air stone 54 is normally placed over the end of the aeration conduit so as to disperse the forced air into minute bubbles which rise to the surface of the water and thereby replenishes the oxygen supply in the water.

As best shown in FIGS. 7, 8 and 9, a box filter or other type interior filter 56 may be used with the present invention to provide filtration of the aquarium's water instead of the use of circulating filtration conduits 14, 15, and 16 and the accompanying filter pump and material housed in container 57 (see FIG. 1). The box filter provides a simple manner to filter aquarium water by pumping air down air conduit 58 so as to form bubbles in outflowing conduit 59. The air entering outflowing conduit 59 forms bubbles 60 which rise upward forcing the water space between the bubbles, as shown by arrow 61, to move upward into the main portion of the aquarium. This water is thus replaced by water within the main portion of the aquarium into the box filter as shown by arrows 62. This water thus passes through the filtration material 63 within the box filter thereby cleansing and filtering the water.

As seen in FIGS. 7 and 9, the diorama backdrop may alternatively include a recessed portion 64 dimensioned for receipt of the box filter 56. The diorama backdrop also incorporates an aperture 66 through which the outer extension of outflowing conduit 59 may protrude. Thus, as best seen in FIG. 7, the box filter is installed in the alternative version of the present invention by first placing the filter within the recess 64 and then inserting backdrop portion 68, housing recess 64, with the remainder of the backdrop. Thus, the diorama backdrop not only houses the box filter but also provides for its unhampered use while yielding an aesthetically pleasing appearance to the aquarium. This alternative backdrop may be used without the bottom liner if only a decorative backdrop is desired.

Figure 10:
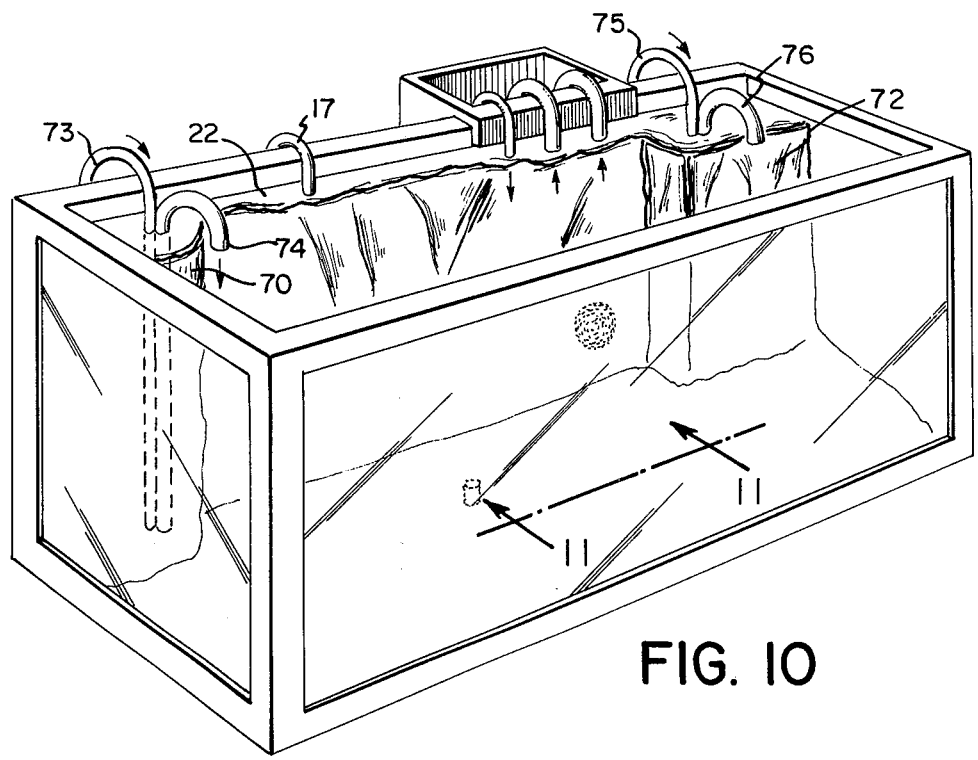
FIG. 10 is a perspective view of an alternate embodiment of the present invention adapted for use with salt water aquariums.
Figure 11:
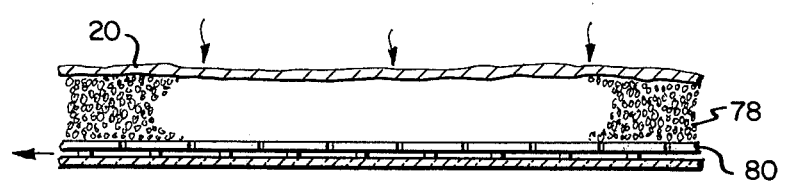
FIG. 11 is a partially cut away cross-sectional side elevational view of the bottom portion of the liner shown in FIG. 10, as well as the bottom portion of the salt water aquarium.

As best seen in FIGS. 10 and 11, the present invention may also be used with salt water aquariums. In this version of the present invention, the diorama backdrop 22 incorporates two inwardly extending portions 70 and 72 to house buffering and cleansing conduits 73, 74, 75 and 76. These conduits are necessary for circulating the water through buffering gravel 78 so as to maintain the salt water at the proper pH level. As shown in FIG. 11, the bottom portion of the salt water version of the present invention is formed from a water porous material and overlays the buffering gravel 78. Beneath the buffering gravel is located a standard under gravel filter plate 80 through which the water flowing through the buffering gravel passes so as to be expelled back into the aquarium tank via buffering and cleaning conduits 74 and 76. The air inlet conduits 73 and 75 propel the water up and out conduits 74 and 76 in a manner analogous to box filter 56, described earlier.

The unitary aquarium liner of the present invention as directed to the salt water aquarium tank is in its other functions, analogous to the fresh water version of the present invention. Thus, it may be formed from a unitary solid material or it may be formed from several pieces that integrally connect to form a unitary aquarium liner as discussed in the fresh water version of the present invention.

Thus, what has been described is a decorative, unitary aquarium liner for simulating a scene underwater that comprises a bottom and a diorium backdrop which integrally combine to form a unitary aesthetic scene. The diorium backdrop is dimensioned for receipt of aquarium accessories such as filtering conduits, aeration conduits, and water heaters so as to conceal these accessories from the observer's view while not impeding the intended function of these accessories. The aquarium liner of the present invention thus provides an insertion for an aquarium which converts the aquarium into both an attractively looking habitat for fresh or salt water fish, as well as eliminating the need for sand, gravel and rocks commonly used in present day aquariums. By thus eliminating the use of sand and gravel, the present invention allows the aquarium owner to create an aquarium habitat without the need for periodic cleaning and removal of the sand and gravel so as to clean the aquarium and replace the used sand and gravel with fresh, clean sand and gravel. The aquarium liner may be manufactured with the aquarium tank and prepackaged with all needed accessories so as to yield a complete, aesthetically pleasing underwater habitat. The aquarium liner of the present invention may, of course, be used with any shape aquarium tank.

It will thus be seen that the objects set forth above, and those made apparent from the preceding description, are efficiently attained and, since certain changes may be made in the above construction without departing from the scope of the invention, it it intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having thus described the invention, what is claimed is:

1. An aquarium liner for insertion in an aquarium so as to conceal aquarium accessories while providing for their unhampered operation and eliminating the need for sand and gravel comprising:
    A. a bottom member dimensioned for insertion in an aquarium over substantially the entire inner bottom surface of the aquarium, said bottom member having an upper surface and a first aeration conduit passageway having an aperture passing through the upper surface of the member; and
    B. a diorama backdrop member dimensioned for receipt within the aquarium so as to cover substantially the entire inner rear surface of the aquarium, having a lower region dimensioned for integral combination with the rearward region of the bottom member, an upper surface extending near and substantially parallel to the rearward, upper termination of the aquarium, and an outer surface facing toward the inner, front surface of the aquarium, said backdrop member having, at least one recess formed therein behind the outer surface and extending through its upper surface for receipt of aquarium accessories, a porous region passing through the outer surface of the diorama backdrop and communicating with at least one of said recesses for circulation of water therethrough, and a second aeration conduit passageway communicable with the first aeration conduit passageway so as to provide oxygen to the aquarium water.

2. A unitary aquarium liner as defined in claim 1, further comprising:
    C. at least one sidewall integrally terminating with the bottom member and diorama backdrop.

3. A unitary aquarium liner as defined in claim 1, further comprising receptacle means extending from the bottom member for receiving and gripping underwater plants or decorations.

4. A unitary aquarium liner as defined in claim 1, wherein the bottom member and the diorium backdrop are formed from a unitary thermoplastic material.

5. A unitary aquarium liner for insertion in an aquarium so as to conceal aquarium accessories while providing for their unhampered operation and eliminating the need for sand and gravel comprising:
    A. a bottom member dimensioned for insertion in an aquarium over substantially the entire inner bottom surface of the aquarium; and
    B. a diorama backdrop member dimensioned for receipt within the aquarium so as to cover substantially the entire inner rear surface of the aquarium, having a lower region dimensioned for integral combination with the rearward region of the bottom member, an upper surface extending near and substantially parallel to the rearward, upper termination of the aquarium, and an outer surface facing toward the inner, front surface of the aquarium, said backdrop member having,
        a. at least one recess formed therein behind the outer surface and extending through the upper surface of the backdrop member for receipt of aquarium accessories,
        b. a porous region passing through the outer surface of the backdrop member and communicating with at least one of said recesses for circulation of water therethrough,
        c. an elongated aperture extending through the outer and upper surface of the backdrop member in a generally vertical direction for receipt of a heater tube of a water heater aquarium accessory so that the heater tube may extend through the diorama backdrop into the main portion of the aquarium, and
        d. an overhang extension member extending from the outer surface of the diorama backdrop and depending over the heater tube so as to conceal the heater tube from view while providing adequate water circulation past the heater tube for heating the aquarium water.

6. A unitary aquarium liner for insertion in an aquarium so as to conceal aquarium accessories while providing for their unhampered operation and eliminating the need for sand and gravel comprising:
    A. a bottom member dimensioned for insertion in an aquarium over substantially the entire inner bottom surface of the aquarium; and
    B. a diorama backdrop member dimensioned for receipt within the aquarium so as to cover substantially the entire inner rear surface of the aquarium, having a lower region dimensioned for integral combination with the rearward region of the bottom member, an upper surface extending near and substantially parallel to the rearward, upper termination of the aquarium, and an outer surface facing toward the inner, front surface of the aquarium, said backdrop member having, a. a removable slotted member dimensioned for interfitting with a portion of the remainder of the diorama backdrop and having a recess formed therein, behind the outer surface thereof for receipt of aquarium accessories while allowing for their easy removal, and b. a porous region passing through its outer surface into said recess so as to provide for unhampered operation of the aquarium accessories placed within said second recess.

7. An aquarium liner as defined in claim 6, wherein the diorama backdrop member further comprises a second recess formed in the diorama backdrop positioned away from said first recess and having a second porous region passing through the outer surface of the diorama backdrop to said second recess, said second recess passing through the upper surface of the diorama backdrop for insertion of at least one aquarium accessory.

8. An aquarium liner as defined in claim 7, wherein the diorama backdrop further incorporates a first aeration conduit passageway and wherein the bottom member further incorporates a second aeration conduit passageway, said second passageway having an aperture passing through the upper surface of the bottom member so that an aeration conduit may pass therethrough so as to provide oxygen to the aquarium water.

9. A unitary aquarium liner for insertion in an aquarium so as to conceal aquarium accessories while providing for their unhampered operation and eliminating the need for sand and gravel comprising:

A. a bottom member dimensioned for insertion in an aquarium over substantially the entire inner bottom surface of the aquarium; and B. a diorama backdrop member dimensioned for receipt within the aquarium so as to cover substantially the entire inner rear surface of the aquarium, having a lower region dimensioned for integral combination with the rearward region of the bottom member, an upper surface extending near and substantially parallel to the rearward, upper termination of the aquarium, and an outer surface facing toward the inner, front surface of the aquarium, said backdrop member having, a. a first recess formed in the diorama backdrop and having a porous region passing from said recess through the outer surface of the diorama backdrop, and having apertures passing from said recess through the upper surface of the diorama backdrop for insertion of circulating conduit aquarium accessories therethrough so as to filter water passing through said porous region and re-inserting filtered water back to the aquarium, and b. a second recess formed in the diorama backdrop positioned away from said first recess and having a second porous region passing through the outer surface of the diorama backdrop to said second recess, said second recess passing through the upper surface of the diorama backdrop for insertion of a water heater aquarium accessory so as to allow the heater to heat water within the aquarium while concealing the heater from external view.

10. An aquarium liner for insertion in an aquarium so as to conceal aquarium accessories while providing for their unhampered operation and eliminating the need for sand and gravel comprising:

A. a bottom member dimensioned for insertion in an aquarium over substantially the entire inner bottom surface of the aquarium; and B. a diorama backdrop member dimensioned for receipt within the aquarium so as to cover substantially the entire inner rear surface of the aquarium, having a lower region dimensioned for integral combination with the rearward region of the bottom member, an upper surface extending near and substantially parallel to the rearward, upper termination of the aquarium, and an outer surface facing toward the inner, front surface of the aquarium, said backdrop member having at least one recess comprising an upwardly extending passageway passing through the upper surface of a portion of the diorama backdrop, said portion of the diorama backdrop extending outwardly away from the remainder of the diorama backdrop and having an aperture passing through the outer surface of the diorama backdrop into said recess, said recess dimensioned for insertion of a box-type filter accessory so as to communicate through the upper surface of the diorama backdrop for passage of air into the box filter and for the filtering of water through the box filter out of the water conduit of the box filter through the aperture passing through the outer surface of the diorama backdrop into the recess.

11. An aquarium liner for insertion in an aquarium so as to conceal aquarium accessories while providing for their unhampered operation and eliminating the need for sand and gravel within the aquarium, comprising:

A. a hollow thin-walled bottom member dimensioned for insertion in an aquarium over substantially the entire inner bottom surface of the aquarium, having means for passage of water through the bottom member into the hollow region between the lower surface of the member and the upper inner bottom surface of the aquarium, said bottom member having an upper surface and an aperture passing through the upper surface for receipt of an aeration conduit of an aeration conduit accessory; and B. a thin-walled diorama backdrop member dimensioned for receipt within the aquarium so as to cover substantially the entire inner rear surface of the aquarium and having a lower region dimensioned for integral combination with the rearward region of the bottom member, and an upper surface extending near and substantially parallel to the rearward, upper termination of the aquarium and an outer surface facing toward the inner front surface of the aquarium, said backdrop member having, at least one recess formed therein behind the outer surface and extending through the upper surface of the backdrop member, for receipt of aquarium accessories, a porous region passing through the outer front surface of the diorama backdrop and communicating with the recess for circulation of water therethrough, and an aperture passing through the upper surface of the diorama backdrop for receipt of said aeration conduit of said aeration conduit accessory so as to provide oxygen to the aquarium water through the aperture in the bottom member.

12. A unitary aquarium liner as defined in claim 11, further comprising:

C. at least one thin-walled sidewall integrally terminating with the bottom member in the diorama backdrop.

13. A unitary aquarium liner as defined in claim 11, further comprising receptacle means extending from the bottom member for receiving and gripping underwater plants or other decorations.

14. A unitary aquarium liner as defined in claim 11, wherein the bottom member and the diorama backdrop are formed from a unitary thermoplastic sheet of material.

15. A unitary aquarium liner for insertion in an aquarium so as to conceal aquarium accessories while providing for their unhampered operation and eliminating the need for sand and gravel within the aquarium, comprising:
A. a hollow thin-walled bottom member dimensioned for insertion in an aquarium over substantially the entire bottom surface of the aquarium, having means for passage of water through the bottom member into the hollow region between the lower surface of the member and the upper inner bottom surface of the aquarium; and
B. a thin-walled diorama backdrop member dimensioned for receipt within the aquarium so as to cover substantially the entire inner rear surface of the aquarium and having a lower region dimensioned for integral combination with the rearward region of the bottom member, and an upper surface extending near and substantially parallel to the rearward, upper termination of the aquarium and an outer surface facing toward the inner front surface of the aquarium, said backdrop member having, at least one recess formed therein behind the outer surface and extending through the upper surface of the backdrop member for receipt of aquarium accessories, a porous region passing through the outer front surface of the diorama backdrop and communicating with the recess for circulation of water therethrough, an aperture extending through the outer and upper surface of the backdrop member in a generally vertical direction for receipt of a heater tube of a heater aquarium accessory so that the heater tube may extend through the diorama backdrop into the main portion of the aquarium, and an overhang extension member extending from the outer surface of the diorama backdrop and depending over the heater tube so as to conceal the heater tube from view while providing adequate water circulation past the heater tube for heating the aquarium water.

16. A diorama backdrop for insertion in an aquarium so as to conceal aquarium accessories, including a box type water filter having an air inlet conduit and an outflowing conduit, while providing for their unhampered operation, comprising a backdrop member dimensioned for receipt within the aquarium so as to cover substantially the entire inner rear surface of the aquarium, said member having:
1. an outer surface facing toward the inner, front surface of the aquarium;
2. an upper surface extending near the rearward, upper termination of the aquarium;
3. a rectangular cross-sectional recess dimensioned for receipt of said box type water filter having an aperture passing through the outer surface of the diorama backdrop into said rectangular cross-sectional recess dimensioned for allowing the outflowing conduit of said box type filter to pass therethrough; and
4. an upwardly extending passageway passing through the upper surface of the diorama backdrop and into said rectangular cross-sectional recess, and dimensioned for receipt of the air inlet conduit of said filter;

whereby the box filter is concealed behind said rectangular cross-sectional recess while said recess, passageway and aperture provide for the filter's unhampered operation by allowing air to enter the air inlet conduit of the filter and filtered water to pass from the outflowing conduit of the filter into the main portion of the aquarium.

17. An aquarium diorama backdrop for insertion in an aquarium so as to conceal aquarium accessories while providing for their unhampered operation, comprising a diorama backdrop member dimensioned for receipt within the aquarium so as to cover substantially the entire rear surface of the aquarium, said backdrop member having:
a. an outer surface facing toward the inner, front surface of the diorama;
b. an upper surface extending near the rearward, upper termination of the aquarium;
c. at least one recess formed behind the outer surface of the backdrop member and extending through the upper surface of the backdrop member for receipt of aquarium accessories;
d. a porous region passing through the outer surface of the backdrop member and communicating with at least one of said recesses for circulation of water therethrough;
e. an elongated aperture extending through the upper surface of the backdrop member at one end thereof and through the outer surface of the backdrop member at the other end thereof for receipt of a heater tube of a water heater aquarium accessory so that the heater tube may extend through the diorama backdrop into the main portion of the aquarium; and
f. an overhang extension member extending from the outer surface of the diorama backdrop and depending over the region where the heater tube extends so as to conceal the heater tube from view while providing adequate water circulation past the heater tube for heating the aquarium water.

18. An aquarium diorama backdrop for insertion in an aquarium so as to conceal aquarium accessories while providing for their unhampered operation, comprising a diorama backdrop member dimensioned for receipt within the aquarium so as to cover substantially the entire rear surface of the aquarium, said backdrop member having:
a. an outer surface facing toward the inner, front surface of the diorama;
b. an upper surface extending near the rearward, upper termination of the aquarium;
c. a removable slotted member dimensioned for interfitting with a portion of the remainder of the diorama backdrop member and having a recess formed therein, behind the outer surface thereof, for receipt of aquarium accessories while allowing for their easy removal; and
d. a porous region passing through the outer surface of said removable slotted member into the recess formed by the slotted members so as to provide for unhampered operation of the aquarium accessories placed within said recess.

19. An aquarium diorama backdrop for insertion in an aquarium so as to conceal aquarium accessories while providing for their unhampered operation comprising a diorama backdrop member dimensioned for receipt within the aquarium so as to cover substantially the entire rear surface of the aquarium, said backdrop member having:
   a. an outer surface facing toward the inner, front surface of the diorama;
   b. an upper surface extending near the rearward, upper termination of the aquarium;
   c. a first recess formed by a first portion of the diorama backdrop member having a porous region passing from said recess through the outer surface of the first portion of the diorama backdrop and further having an aperture passing from said recess through the upper surface of the first portion of the diorama backdrop member for insertion therethrough of circulating conduit aquarium accessories so as to filter water passing through said first porous region and re-inserting filtered water back into the aquarium; and
   d. a second recess formed by a second portion of the diorama backdrop member positioned away from the first recess having a second porous region passing through the outer surface of the second portion into said second recess, said second recess passing through the upper surface of the second portion of the diorama backdrop member for insertion of a water heater aquarium accessory so as to allow the heater to heat the water within the aquarium while concealing the heater from external view.

* * * * *